United States Patent
Disley et al.

(10) Patent No.: US 9,931,989 B2
(45) Date of Patent: Apr. 3, 2018

(54) LIGHT WEIGHT LOW COST STRETCHING LOAD COVER

(71) Applicant: VOLVO CAR CORPORATION, Gothenburg (SE)

(72) Inventors: Jonathan Disley, Asa (SE); Niklas Palm, Gothenburg (SE); Juan Pablo Bernal Pabon, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 15/257,345

(22) Filed: Sep. 6, 2016

(65) Prior Publication Data
US 2017/0066381 A1 Mar. 9, 2017

(30) Foreign Application Priority Data

Sep. 7, 2015 (EP) .................................... 15183993

(51) Int. Cl.
B60R 5/04 (2006.01)

(52) U.S. Cl.
CPC .............. B60R 5/045 (2013.01); B60R 5/047 (2013.01)

(58) Field of Classification Search
CPC ................................ B60R 5/045; B60R 5/047
USPC ..................................... 296/24.43, 56, 146.8
See application file for complete search history.

(56) References Cited

U.S. PATENT DOCUMENTS

| 5,618,077 | A | 4/1997 | Ament et al. |
| 9,238,438 | B1 * | 1/2016 | Valencia Cruz ........ B60R 5/045 |
| 2006/0012206 | A1 * | 1/2006 | Plettrichs ................ B60R 5/047 296/37.16 |

(Continued)

FOREIGN PATENT DOCUMENTS

| DE | 1630866 A1 | 7/1971 |
| DE | 19811815 A1 | 9/1999 |

(Continued)

OTHER PUBLICATIONS

Machine Tranlation of FR2844485A1, printed from the EPO website, Jan. 23, 2017.*

(Continued)

Primary Examiner — Jason S Morrow
(74) Attorney, Agent, or Firm — Brooks Kushman P.C.

(57) ABSTRACT

A load cover arrangement for an interior luggage compartment of a vehicle. The load cover arrangement comprises a load cover having a fixed end attached to a tailgate of the vehicle, and a front portion having fastening members for releasably attaching to a front side of the luggage compartment. When attached, the load cover extends a distance $D_{closed}$ in a closed tailgate position, and a distance $D_{open}$ in an open tailgate position, measured from an opening in the tailgate and across the luggage compartment. The fixed end of the load cover is arranged inside of the tailgate and the load cover extends an internal distance $D_{internal}$ and projects out through the opening in the tailgate, wherein at least a portion of the load cover is resiliently elastic so that it is stretchable between a retracted position with a length of $D_{retracted}$, the closed tailgate position and the open tailgate position.

20 Claims, 7 Drawing Sheets

(56) References Cited

U.S. PATENT DOCUMENTS

| | | | | |
|---|---|---|---|---|
| 2009/0115216 A1* | 5/2009 | Plettrichs | ................ | B60R 5/047 |
| | | | | 296/37.16 |
| 2014/0008933 A1* | 1/2014 | Nagao | ..................... | B60R 5/044 |
| | | | | 296/37.16 |
| 2014/0015275 A1* | 1/2014 | Miyazaki | ................ | B60R 5/044 |
| | | | | 296/136.03 |
| 2016/0325686 A1* | 11/2016 | Krishnan | ................ | B60R 5/047 |

FOREIGN PATENT DOCUMENTS

| | | | | |
|---|---|---|---|---|
| DE | 10204558 C1 | 6/2003 | | |
| DE | 102008014876 B3 | 8/2009 | | |
| FR | 2844485 A1 * | 3/2004 | ............. | B60R 5/047 |
| FR | 2862586 A1 * | 5/2005 | ............. | B60R 5/045 |

OTHER PUBLICATIONS

Machine Translation of FR-2862586-A1, printed from the EPO website, Jul. 12, 2017.*
Extended European Search Report dated Nov. 16, 2015, Application No. 15183993.3-1503—Applicant Volvo Car Corporation, 6 Pages.

* cited by examiner

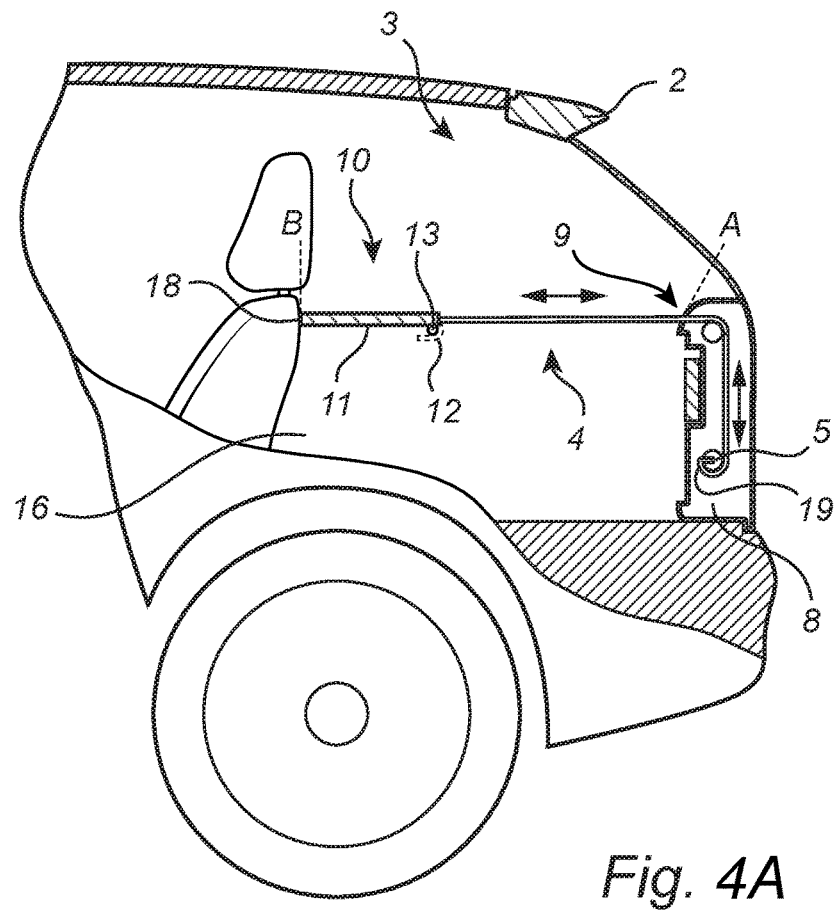
*Fig. 4A*
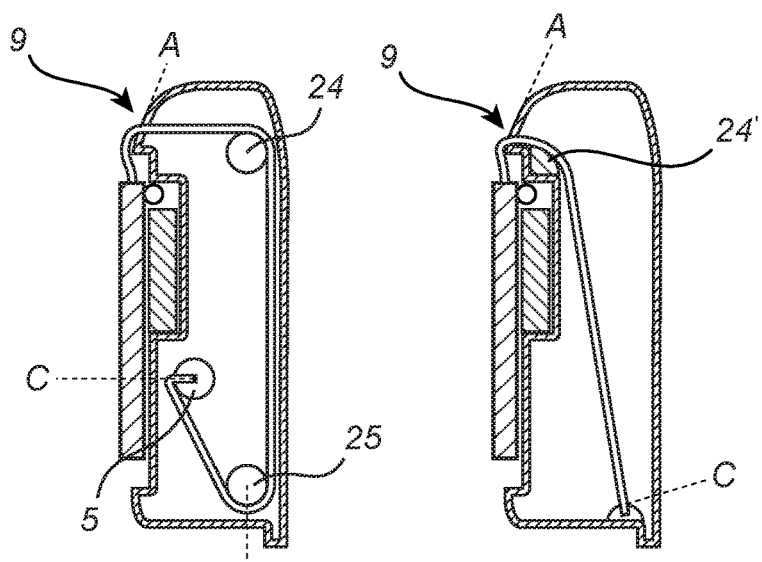
*Fig. 4A'*  *Fig. 4A"*

LIGHT WEIGHT LOW COST STRETCHING LOAD COVER

CROSS-REFERENCE TO RELATED APPLICATIONS

This application claims foreign priority benefits under 35 U.S.C. § 119(a)-(d) to European patent application number EP 15183993.3, filed Sep. 7, 2015, which is incorporated by reference in its entirety.

TECHNICAL FIELD

This disclosure relates to a load cover for a luggage compartment in a vehicle.

BACKGROUND

A luggage compartment in a car of for example one of the types station wagon, sports utility vehicle or hatchback is typically open to the passenger compartment and comes with an unrestricted view from the outside of any items stored in the luggage compartment. This is partly an aesthetic problem and partly a security problem. Furthermore, storage items may move around unhindered as the vehicle accelerates, maneuvers and decelerates.

Conventional load cover arrangements, such as the ones described in U.S. Pat. No. 5,618,077 and DE 10 2008 014 876, comprise a cassette or elongated housing arranged laterally in the front of the luggage compartment relative to the normal driving direction of the vehicle. The housing is usually arranged at the upper portion of the rear seats, and in the housing a winding shaft rotatably supports a web or flexible fabric which is slidably pulled rearwards to cover the luggage compartment as the winding shaft unwinds. The elongated housings may be relatively obstructive as they occupy some of the space in the luggage compartment and particularly if the seats are foldable to create more space, wherein the housing is often releasably arranged to the lateral side panels and needs to be removed and stored elsewhere not to obstruct bulky luggage or other large items. These solutions are relatively expensive, complicated and heavy components that contain moving parts which may cause rattling noises and may be more prone to fail. Further alternative solutions include such as the simple one described in DE 1 630 866 where a load cover is fastened to the rear seats on one end and fastened to the tail gate on the other end and which comprises an elastic stretchable fabric to account for the tailgate opening and for different sized luggage placed in the luggage compartment. It is desirable to have a load cover arrangement which is less obstructive and preferably lighter and also more cost effective than conventional load cover arrangement.

SUMMARY

It is an object of the present disclosure to address the shortcomings of the prior art, and to provide an improved load cover arrangement.

According to a first aspect of the disclosure, these and other objects are achieved with a load cover arrangement for an interior luggage compartment of a vehicle. The load cover arrangement comprises a tailgate of the vehicle, a load cover having a fixed end attached to the tailgate, and a front portion having fastening members for releasably attaching a front end of the load cover to a front side of the luggage compartment. When attached, the load cover extends a distance $D_{closed}$ in a closed tailgate position, and a distance $D_{open}$ in an open tailgate position, as measured from an opening in the tailgate and along the load cover in the longitudinal direction of the luggage compartment to the front end of the cover. The fixed end of the load cover is arranged inside of the tailgate where the load cover extends an internal distance $D_{internal}$ and projects out through the opening in the tailgate, wherein at least a portion of the load cover is resiliently elastic so that it is stretchable between a retracted position with a first length of $D_{retracted}$, the closed tailgate position with a second length $D_{closed}$ and the open tailgate position with a third length $D_{open}$.

The terms $D_{retracted}$, $D_{closed}$, $D_{open}$ and $D_{internal}$, are explained in the detailed description. The distances refer to positions of the load cover arrangement.

The retracted position when at least a majority of the load cover is retracted into the tailgate and not covering the luggage compartment, wherein essentially no forces apart from gravity and counteracting forces from holding members or fixation points acts on the load cover. The closed tailgate position when the front portion of the load cover is releasably attached to the front of the luggage compartment and the load cover is covering at least a majority of a horizontal plane area of the luggage compartment while the tailgate is closed. The open tailgate position when the front portion of the load cover is releasably attached to the front portion of the luggage compartment and covering at least a majority of the horizontal plane area of the luggage compartment while the tailgate is open, wherein at least a majority of a luggage compartment covering portion of the load cover is essentially inclined at an angle to the horizontal plane with reference to the vehicle.

Furthermore, between the closed tailgate position and the open tailgate position there may be a position where the load cover extends a distance $D_{max}$ which is a greater distance than $D_{open}$. This may be the maximum distance of opening of the tailgate to the front side of the luggage compartment, during a pivoting opening/closing movement of the tailgate.

In the context of the disclosure it should be understood that, the front portion may comprise fastening members such as loops and hooks, magnets, clamps or press-fit fastening means. Alternatively, the front portion may be an elongated member, such as a bar, attached along the lateral extension of the opposite end of the load cover, similar to bar 17 shown in FIG. 1 of U.S. Pat. No. 5,618,077. Which elongated member may have a wider lateral extension than the load cover and which elongated member's ends may engage with for example hooks at the front of the luggage compartment, or with openings in the lateral side panels of the luggage compartment, which openings may be adapted for receiving and holding the ends of the elongated member.

Furthermore, the front portion may comprise a planar structure, which is known from conventional load cover arrangements, such as the structure 6 shown in FIG. 1 of DE 10 2008 014 876 B3. Which planar structure may be a planar projection which may be molded in plastic or comprise a composite of fibers and resin or it may be a laminate. Furthermore, the planar structure may be further enclosed in a fabric, leather, vinyl, etc. The planar structure may comprise a handle and laterally projecting ends for engaging with hooks or holders in for example the side panels, C-pillars, or rear seats of the vehicle. The lists are non-exhaustive.

The planar structures known from conventional load cover arrangements may be limited in torsional and/or tensile stress due to the formation and regular use of the handle. The inventors have realized that further advantages may be achieved by removing the handle from the front portion and enabling a user to push against the front portion. The front portion may be extended to a greater longitudinal length if the handle is removed. The arrangement of the load cover in the tailgate and the fastening elements for the front portion in the front of the luggage compartment may allow a more ergonomical operation of a handle less front portion compared to the operation of a handle less front portion on a load cover arrangement arranged at the front of the luggage compartment.

The fastening members may engage with corresponding holding elements, openings, etc., that are fixedly arranged to the front of the luggage compartment, in the lateral side panels of the luggage compartment and/or on or adjacent to the floor of the luggage compartment. Furthermore, the holding elements may be arranged to rear seats of the vehicle, wherein the rear seats of the vehicle may be foldable between upright positions and folded positions. There may be fastening means arranged at multiple locations in the vehicle. Therefore, the extension of the load cover in and between the closed tailgate position and the open tailgate position may further vary depending on which holding elements the front end is attached to and/or which position the rear seats are arranged in.

In the context of the disclosure the tailgate is normally be understood as a hatchback or as a rear door of a vehicle which is hinged around a lateral axis of the vehicle, which axis may commonly be aligned with the rear end of the vehicle roof. The load cover should be understood as being at least partly arranged in an enclosure within the structure of the tailgate or within an enclosure formed by an indenture of the structure of the tailgate and an inner panel covering at least part of an inner side of the tailgate, inner being a reference to the interior of the vehicle. The opening in the tailgate may be understood as an opening into the enclosure.

The terms resiliently elastic and stretchable should be understood as meaning properties of materials that may be repeatedly extended and retracted, and which resiliently retract to a state in rest, for example materials such as rubber or synthetic elastomers. For example, the load cover will consequently strive to retract to the retracted position if no force is applied, i.e., in a position of rest. The resilient elasticity may advantageously prevent the load cover from drooping or sagging or at least reduce the hanging between the attached front portion and the opening in the tailgate when the load cover is in the closed tailgate position. The primary elastic expansion direction of the load cover may also be the longitudinal direction of the vehicle. However, a portion of the load cover is comprised inside the tailgate and consequently there may also be an elastic expansion in a longitudinal direction of the tailgate, which direction varies relative to the longitudinal direction of vehicle depending on the position of the tailgate.

The arrangement of the load cover into the tailgate provides a storage of the load cover when it is retracted and not in use, wherein the storage does not take any space from the luggage compartment. Furthermore, the load cover may always be available if needed, as compared to the cassettes of conventional load cover arrangements which a user may need to store separated from the vehicle if transporting large items. The arrangement of the load cover in the tailgate eliminates the need of an additional housing, which may enable weight reduction. The load cover may provide additional acoustic dampening to the tailgate when it is arranged inside the tailgate according to the disclosure.

According to one embodiment, the load cover of the load cover arrangement is not rotatably wound or rolled onto a winding shaft. The resilient elasticity of the load cover allows an arrangement without the need for a rotating winding shaft or other moving parts, which may lower the cost and which may also decrease the risk of malfunction. Elimination of the moving parts may also reduce weight and/or noise such as a rattling noise from moving parts when the vehicle is moving, or the cover is pulled forward to the $D_{open}$ position or put back in the retracted position $D_{retracted}$.

According to one embodiment, when the tailgate is arranged in the open position, and the load cover is pulled from the retracted position to the open position, this does not cause any parts to move.

According to one embodiment, the member or bar to which the load cover is attached is statically attached to the tailgate; statically attached means that the member or bar does not move when the load cover is pulled from the retracted position to the open position; however, there might be a small initial movement when the force is applied to the load cover, thereafter the member or bar does not move. Additionally or alternatively, at least one member or bar which guide the load cover inside the tail gate is statically attached to the tailgate. Additionally or alternatively, all of the members or bars which guide the load cover inside the tail gate are statically attached to the tailgate.

According to one embodiment the load cover has an extension ratio of $(D_{internal}+D_{open})/(D_{internal}+D_{retracted})$. Furthermore, the load cover arrangement may have an initial length equal to, or smaller than, $D_{internal}+D_{retracted}$ when the cover is in a position of rest. The final length of the load cover arrangement in use may be $D_{internal}+D_{open}$. Alternatively, the final length of the load cover arrangement in use may be $D_{internal}+D_{max}$. The final length is shorter than the length where the cover starts to break or is plastically deformed.

According to one embodiment the load cover comprises an opaque portion, being abutted to the front portion, wherein the opaque portion in combination with the front portion have an extension of at least a length $D_{closed}$ in the longitudinal direction, when in the closed tailgate position. Furthermore, the opaque portion, in combination with the front portion, may be the only visible portion of the load cover in the closed tailgate position. Alternatively, the opaque portion, in combination with the front portion, may be the only visible portion of the load cover in the closed tailgate position and in the open tailgate position. The opacity of the opaque portion provides a visual cover of the luggage compartment which may be advantageous for aesthetic reasons for security reasons. The opaque portion may have a transmission of visible light smaller than 10%, or smaller than 5%, or smaller than 3% or smaller than 1%.

Furthermore, the rest of the load cover, arranged further towards the fixed end may be transparent. For example a partitioning of the load cover into two or more portions arranged between the fixed end and the front end allows the load cover to be formed by portions comprising one or more different materials. Consequently, the one or more other portions may have different properties which may be discernible from inside and/or outside the vehicle. For example, the one or more other materials of the one or more other portions may be comprise a less dense weave, a sparse web, be perforated or have a glossy surface, the list is non-exhaustive. Advantages of material density reduction may be a reduction of weight. Non-visible or rarely visible portions may have reduced optical requirements which may increase the range of selectable materials.

According to one embodiment at least the opaque portion of the load cover has a lateral extension covering at least 90% of the lateral extension of the luggage compartment. Furthermore, the opaque portion may be continuous across the lateral extension of the load cover. Further portions of the load cover arranged further towards the fixed end may each respectively have lateral extension smaller than the lateral extension of the opaque portion. The use of pieces of smaller lateral extension than the opaque portion may reduce weight. Furthermore, the use of pieces of smaller lateral extension may allow for cost reduction due to smaller parts or due to greater availability of parts that need less adaptation.

According to one embodiment the load cover may comprise a first cover portion arranged adjacent to the front portion, and a second cover portion arranged adjacent to the fixed end, wherein the second cover portion may have an extension ratio $\lambda_{2nd}$ that is greater than an extension ratio of the first cover portion. The first cover portion may be the referred to as to be the front most portion of the cover, excluding the front portion. Similarly, the second cover portion may be referred to as the rear most load cover portion. Furthermore, when the load cover is moved between the retracted position, the closed tailgate position and the open tailgate position the second cover portion may expand and/or retract more than the first cover portion. The second cover portion may expand and/or retract more than 2 times the expansion and/or retraction of the first cover portion, or more than 5 times or more than 10 times. Furthermore, the first cover portion may be the opaque portion.

Since the second cover portion may be arranged inside the tailgate to a greater extent than the first cover portion this enables the use of materials which may have properties more suited for elastic expansion and retraction but which may for example be aesthetically unsuitably or sensitive to sunlight, etc. The first cover portion may be similarly have reduced requirements on elasticity and therefore materials which may have properties more suited for visually covering the luggage compartment are enabled, for example materials such as leather, synthetic leather, vinyl, etc. and properties such as higher resistance against sunlight, greater torsional rigidity, etc.

According to one embodiment the load cover may further comprise a third cover portion arranged between the first and the second cover portion, wherein the third cover portion has an extension ratio $\lambda_{3rd}$ that is greater than $\lambda_{2nd}$. While the second cover portion may be adapted to have an extension ratio which allows the second cover portion to accommodate a majority of the load cover's stretchable expansion and or retraction between the retracted position and the closed tailgate position, the third cover portion may be adapted to accommodate the load cover's stretchable expansion and/or retraction between the closed tailgate position and the open tailgate position. The third cover portion may be adapted to be visible only in movement between the closed tailgate position and the open tailgate position, and in the open tailgate position. This enables the use of a material for the third cover portion which may be more elastic than the first cover portion and which may for example be more sensitive to sunlight than the first cover portion, but less sensitive than the second cover portion. Further advantages may for example be use of a material which may otherwise be excluded for selection for aesthetic reasons, such as a material that may be thinner than the first cover portion, or a perforated material or a material comprising one or more cutout pieces.

According to one embodiment the second cover portion comprises one or more elastic straps. In the context of the disclosure elastic straps may be understood as a resiliently elastic material which may each have a lateral extension less than a fourth of the lateral extension of the luggage compartment, or less than a sixth of the lateral extension of the luggage compartment or less than a tenth of the lateral extension of the luggage compartment. One or more elastic straps may for example be one or more rubber bands or one or more elastic polymer bands, the list is non-exhaustive.

According to one embodiment the third cover portion has a final length that may be less than or equal to the difference between $D_{open}$ and $D_{closed}$.

According to another embodiment the second cover portion has a final length that may be less than $D_{internal}$. Furthermore, the load cover arrangement may be adapted so that the second cover portion is contained in the tailgate in all of the retracted position, the closed tailgate position and the open tailgate position. This may reduce requirements on the second cover portion, such as for example aesthetic requirements, light sensitivity, etc., which may reduce cost and/or allow a larger selection of otherwise unsuitable materials.

According to one embodiment the load cover arrangement may further comprise an elongated routing member arranged further from the opening in the tailgate than the fixed end of the load cover, so that the load cover extends the distance $D_{internal}$ from the fixed end via the elongated routing member to the opening and subsequently extends to project out through the opening in the tailgate.

According to one embodiment $D_{open}$ may be 15%+/−10% greater than $D_{closed}$.

According to one embodiment the front portion comprises a planar structure that is larger than the opening in the tailgate. The planar structure may have a length that covers at least 10% of the longitudinal extension of the luggage compartment when the load cover arrangement is releasably attached to the front side of the luggage compartment.

According to one embodiment the planar structure is releasably attachable to the tailgate. The planar structure may for example be provided with magnets that releasably hold the planar structure in the retracted position. In the retracted position the planar structure may be essentially parallel with the tailgate. The releasable attachment of the planar structure in the retracted position may reduce noise of the load cover arrangement as the front portion is held in place.

According to another embodiment the planar structure is adapted to cover a storage indenture in the tail gate when it is releasably attached to the tail gate. In the context of the disclosure the storage indenture should be understood as an indenture in the inner side of the tailgate, inner being a reference to the interior of the vehicle when the tailgate is closed and wherein the indenture consequently is an indenture away from the interior of the vehicle.

BRIEF DESCRIPTION OF THE DRAWINGS

These and other aspects of the present disclosure will now be described in more detail with reference to the attached drawings, which show exemplary embodiments.

FIGS. 4A-C show cross sections of load cover arrangements in different positions.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The definitions of the distances $D_{closed}$, $D_{open}$, $D_{internal}$ and $D_{retracted}$ will be explained with reference to FIGS. 4A-4C.

FIG. 4A shows the load cover arrangement in the closed tailgate position; $D_{closed}$ is defined as the distance along the load cover between the front of the opening A in the tailgate and the front end of the cover B attached at the front of the luggage compartment.

Figure 4B:
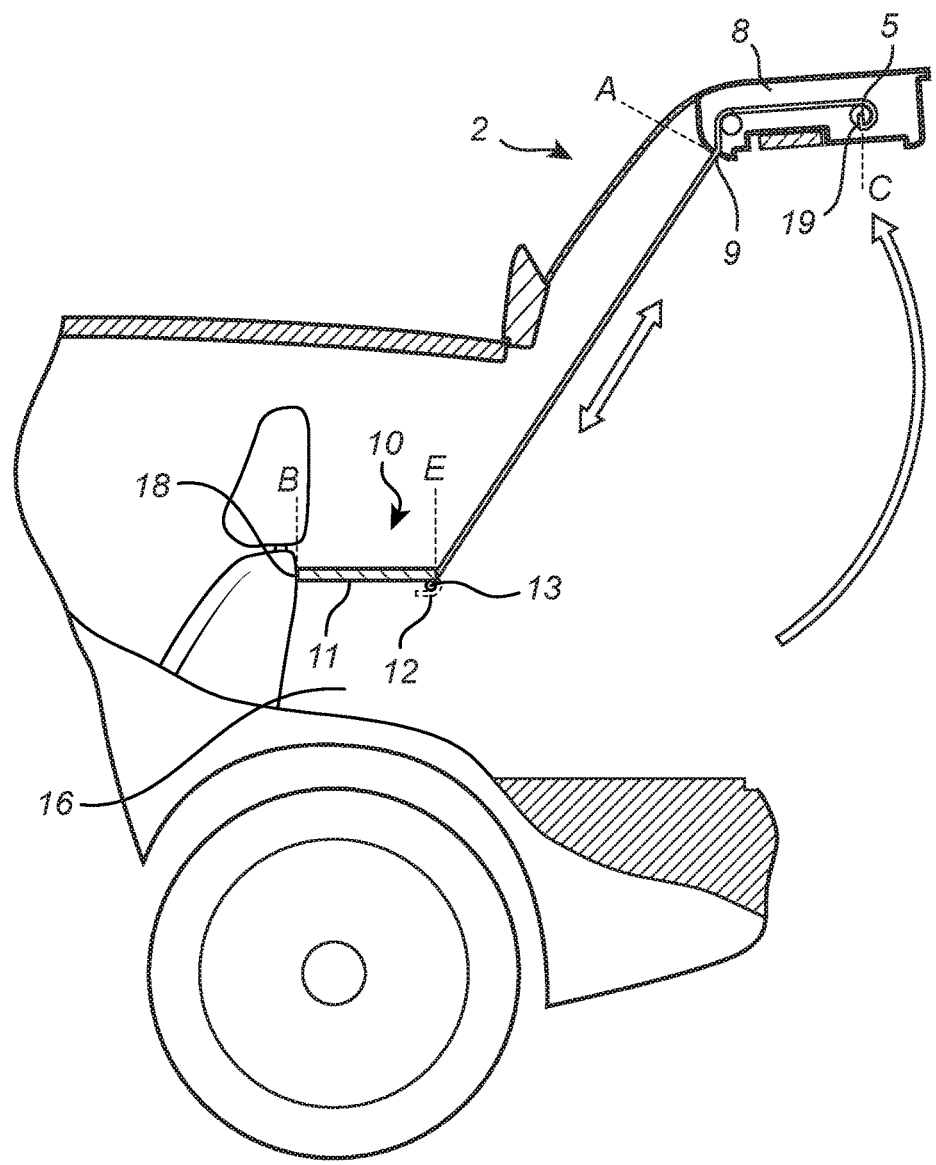

FIG. 4B shows the load cover arrangement in the open tailgate position; $D_{open}$ is defined as the distance along the load cover between like reference points A and B, via E which is where the fastening members of the front portion engage with corresponding holding elements arranged at the front in the luggage compartment.

Figure 4C:
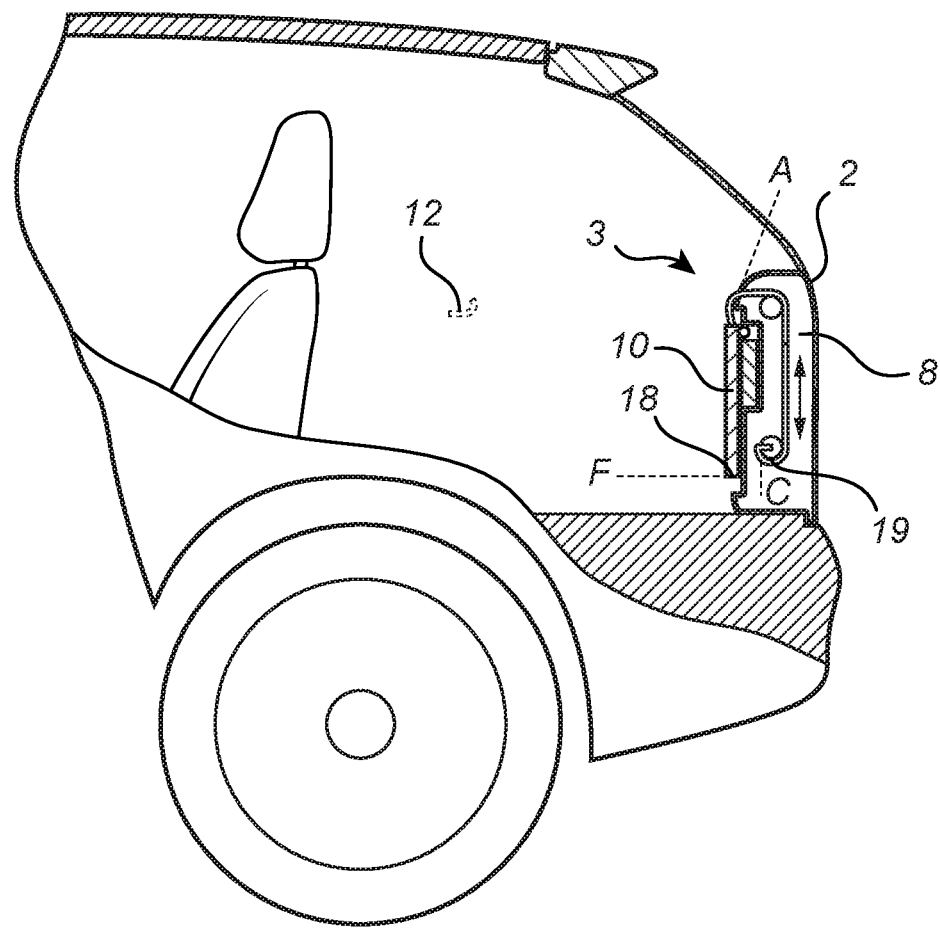

FIG. 4C shows the load cover arrangement in the retracted position; $D_{retracted}$ is defined as the distance the load cover extends from the front of the opening A in the tailgate, i.e., between A and B, when the load cover is not in use.

$D_{internal}$ is defined as the distance the load cover extends from the fixed end C to the front of the opening A in the tailgate, as illustrated in some exemplary embodiments via an elongated routing member D.

In the following detailed description, preferred embodiments of the present disclosure will be described. However, it is to be understood that features of the different embodiments are exchangeable between the embodiments and may be combined in different ways, unless anything else is specifically indicated. The disclosure may, however, be embodied in many different forms and should not be construed as limited to the embodiments set forth herein; rather, these embodiments are provided for thoroughness and completeness. Like reference character refer to like elements throughout the description. It may also be noted that, for the sake of clarity, the dimensions of certain components illustrated in the drawings may differ from the corresponding dimensions in real-life implementations of the disclosure, for instance, and are not considered as limiting. The exemplary embodiment is mainly described with reference to a vehicle with a luggage compartment open to the passenger compartment, whereby the figures may be considered schematic in terms of proportions as vehicles may vary in size and configuration of luggage compartment and tailgate depending on model.

For purposes of description hereunder, the terms "upper", "lower", "right", "left", "vertical", "horizontal", "longitudinal", "lateral", "inside", "outside", "interior", "exterior", "top", "bottom", "front", "rear" or "back" and derivatives thereof shall relate to the disclosure when mounted in a vehicle which is placed on a horizontal plane, unless otherwise stated.

Figure 1:
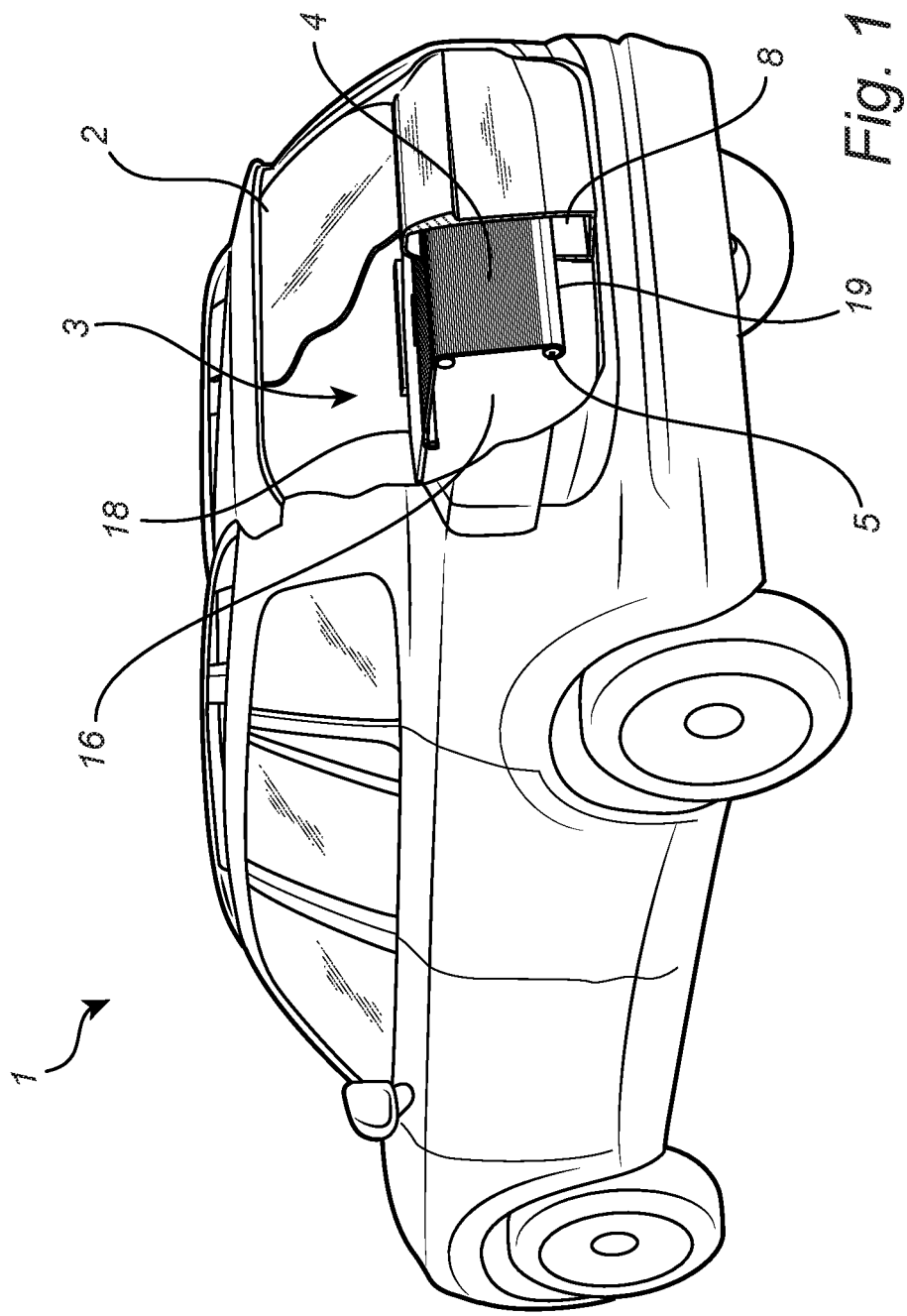
FIG. 1 shows a perspective view of a vehicle with a cutaway detail of a load cover arrangement.

FIG. 1 shows a rear perspective view of an exemplary vehicle 1 of station wagon type or similar. The vehicle 1, as shown in FIG. 1, is oriented so that the back as well as a left side is shown in FIG. 1. The vehicle 1 has a tailgate 2 for allowing loading and unloading of a luggage compartment 16 from the rear of the vehicle 1, which luggage compartment 16 is comprised in the interior of the vehicle 1 and which is shown in FIG. 1 through a partial cross section cutaway of the tailgate 2 along a vertical axis. The tailgate 2 is upward-swinging, and illustrated as closed in which position it covers almost full width and full height of the vehicle's rear side of the body. The tailgate 2 illustrated in FIG. 1 is a one piece door with an integrated window covering a majority of the upper part of the tailgate. An enclosure 8 or cavity is formed in the tailgate 2, which enclosure 8 covers a majority of the width and height of the lower part of the tailgate. The enclosure 8 may be formed for example in a hollow profile of the tailgate's lower part or by arranging an interior panel to the tailgate, where the tailgate and the interior panel are shaped so that an enclosure 8 is formed, for example by arranging concave cross sectional shapes facing each other.

FIG. 1 shows an elongated bar 5 arranged within the enclosure 8 extending along the width of the tailgate 2. The elongated bar 5 is fixedly arranged to a bottom portion of the tailgate 2 and is parallel with the lateral axis of the vehicle. Along the elongated bar 5 an end of a load cover 4 is fastened by fastening means such as seams, glue, rivets, welding, etc. This provides a straight fixation along a first lateral or short side of the load cover 4, in other words the fixed end 19. In FIG. 1 the load cover 4 comprises a one-piece rectangular elastic weave for covering the luggage compartment. The weave may comprise one or more of fabric, elastic polymer, elastomer, latex, rubber, etc., and the term weave should not be interpreted as excluding non-weaved sheets such as for example molded latex. The load cover 4 forms a movable part of a load cover arrangement 3 which is illustrated in a closed tailgate position in FIG. 1. In the closed tailgate position the load cover 4 extends from the elongated bar 5 at the lower part of the enclosure 8, vertically through the enclosure 8 inside the tailgate 2 to an opening (not shown in FIG. 1) through which the load cover 4 extends longitudinally to the front of the luggage compartment 16 where a front portion 10 is releasably attached. The load cover 4 extends horizontally across the luggage compartment 16, below a bottom line of the vehicle's windows, and covers almost full width of the luggage compartment 16. In the retracted position, the closed tailgate position and the open tailgate position the fixed end 19 and a front end 18 of the load cover, are normally parallel and laterally aligned and have substantially the same lateral extension. Furthermore, the long edges of the load cover 4 are essentially parallel to each other and perpendicular to the short edges.

Figure 2:
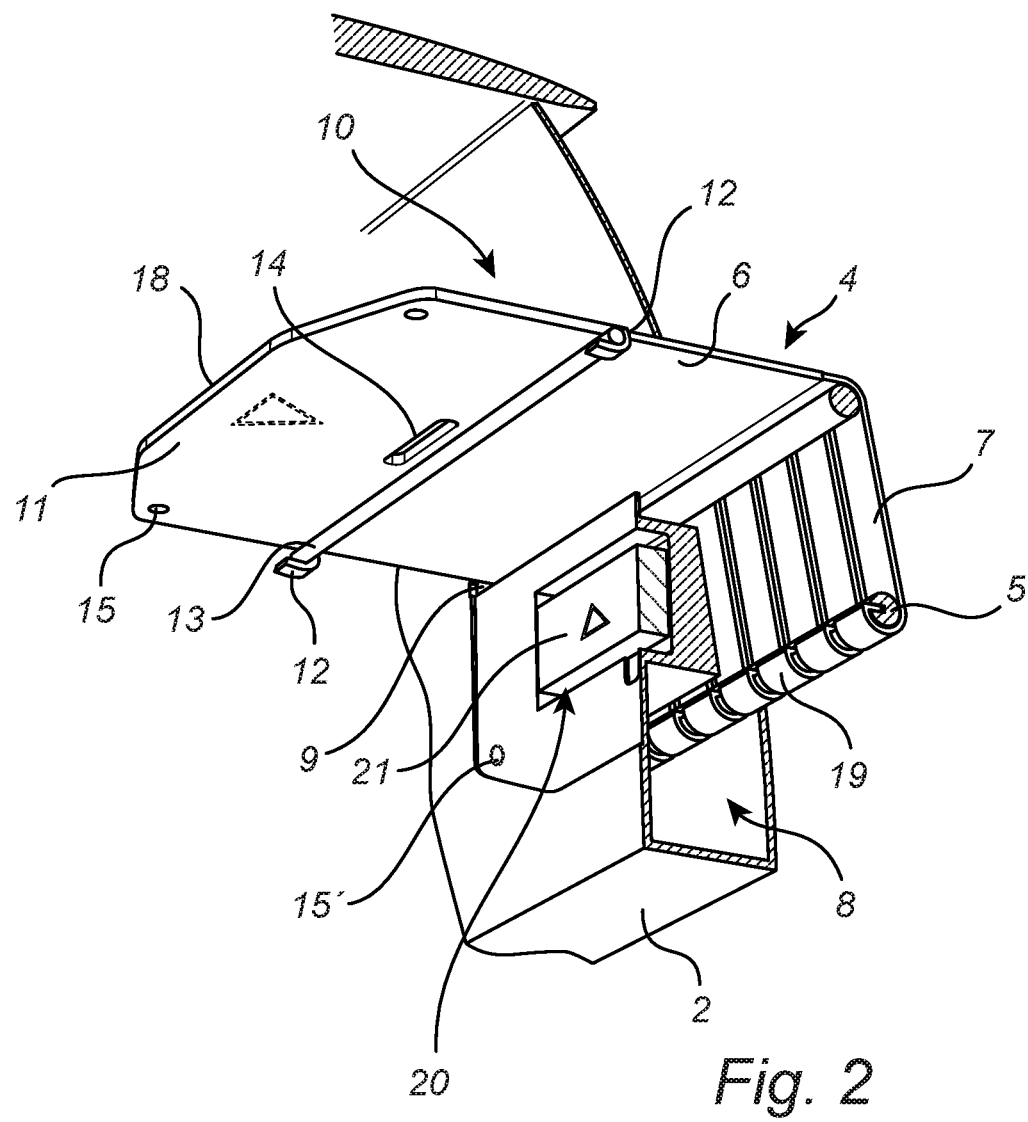
FIG. 2 shows a partial cross section of a tailgate with a load cover arrangement.

FIG. 2 shows a perspective view of a cross section of a tailgate 2 from the inside of a vehicle, with another embodiment of a load cover arrangement 3 in a closed tailgate position. The load cover extends from the elongated bar 5 through the enclosure 8, out of the opening 9 in the tailgate and forwards. The fastening members 13 of the front portion 10 comprise an elongated bar which has a longer lateral extension than the planar structure 11. The ends of the fastening members 13 engage with holding elements 12 in the form of hooks that are fixedly arranged to the interior of the vehicle 1 and which support and hold the load cover 4. The load cover 4 differs from the embodiment illustrated in FIG. 1 in that it comprises a first portion 6 which protrudes from the enclosure 8 and a second portion 7 which is contained inside the enclosure 8. The first portion 6 is opaque and may be formed by for example a dense weave of fabric or multi-layered fabric or a molded sheet of polymers or a composite or a combination thereof, the list is non-exhaustive. The second portion 7 may comprise a plurality of parallel elastic straps distributed along the elongated bar 5, such as for example rubber bands. When the front portion 10 is released and the load cover 4 is retracted to the retracted position, the second portion 7 may be elastically retracted so that more than 95% of the first portion 6 is contained in the enclosure 8 and the planar structure 11 may be folded down to lie flat against the tailgate. The tailgate further comprises a rounded bar or elongated member with a rounded surface arranged in the enclosure 8 at the inside of the opening 9, this provides a surface which may reduce wear on the load cover 4 at a point where the load cover 4 transitions from an extension inside the tailgate to a substantially perpendicular extension through the opening 9.

FIG. 2 further shows the tailgate 2 comprising a storage space or indenture 20 on a side of the tailgate 2 facing the interior. The indenture 20 may be rectangular in shape and be arranged to receive one or more items to be stored and accessible from the rear of the vehicle. In this embodiment the item 21 is a warning triangle. The tailgate 2 further comprises engaging elements 15' which engage with corresponding engaging elements 15 arranged on the planar structure 11 of the front portion 10. The engaging elements 15 may for example comprise magnets, ferrous elements, Velcro, etc., this is a non-exhaustive list.

The load cover 4 will be functionally described with reference to FIG. 3B. When the load cover arrangement is in the retracted position only the front portion 10 of the load cover 4 protrudes from the tailgate and is visible. When the load cover 4 is moved from the retracted position to the open tailgate position or to the closed tailgate position, the load cover 4 is stretched out from the tailgate 2 through the opening 9 so that an increasing length of the first portion 4 protrudes and becomes visible, until the load cover is stretched to a length protruding from the tailgate 2 which covers the distance $D_{open}$ or the distance $D_{closed}$, at which stretched lengths the load cover 4 may be fastened at the front of the luggage compartment. The second portion 7 of the load cover 4 may during this movement be maintained contained in the tailgate 2, so that it is hidden from view. The second cover portion 7 may be significantly more elastic than the first cover portion 6. The percentage of elastic increase in length of the second cover portion 7 may be more than two times the percentage of elastic increase in length of the first cover portion 6, or more than 5 times or more than 10 times.

Figure 3A:
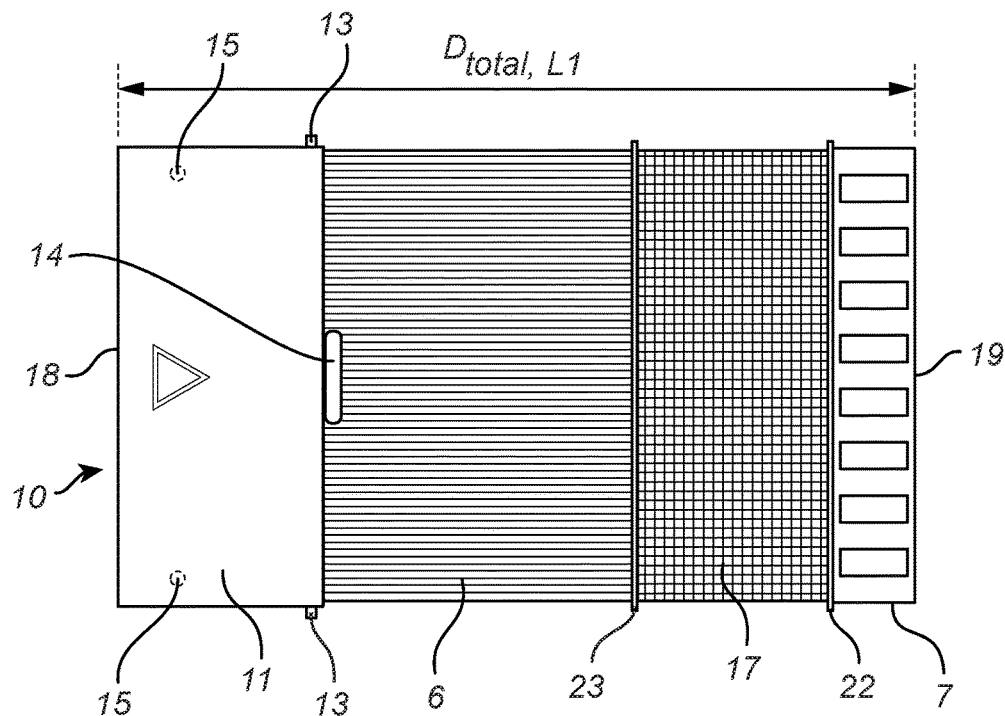
FIGS. 3A-C show schematic top views of exemplary embodiments of load covers.

Furthermore, another embodiment illustrated in FIG. 3A comprises a further portion, the third portion 17, arranged between the first portion 6 and the second portion 7. The third cover portion 17 stretches out to protrude and be visible from the tailgate when the load cover arrangement moves to and from the open tailgate position so that the first cover portion 6 may be less elastic and have a shorter longitudinal extension compared to the embodiment illustrated in FIG. 3B.

Furthermore, a third exemplary embodiment is described with reference to FIG. 3C. The load cover 4 comprises a single elastic portion, the first portion 6, which is hidden in the enclosure 8 of the tailgate 2 in the retracted position and which itself is stretched to partially protrude from the tailgate and partially be contained in the tailgate in the open tailgate position and the closed tailgate position.

FIG. 3A shows a schematic top view of a load cover 4 according to one exemplary embodiment. The load cover 4 is illustrated separated from the vehicle 1 and further components of the load cover arrangement such as the enclosure 8 and opening 9 of the tailgate 2. The load cover 4 as illustrated in FIG. 3A is arranged of a horizontal surface with no external forces acting on it. With reference to the view in FIG. 3A the load cover 4 extends from right to left with a substantially rectangular shape and a longitudinal total initial length equal to $D_{total,L1}$ measured from the fixed end 19 to the front end 18. The load cover may be described from the fixed end 19 to the front end 18, the fixed end 19 forms an edge on the second portion 7 which comprises a sheet of a highly elastic material, such as rubber, having a plurality of longitudinal cutouts that are distributed along the lateral extension of the load cover.

The second portion 7 is attached to a third portion 17 which is abutting the end opposite to the fixed end of the second portion 7. The third portion 17 forms a rectangular piece, which in the state of rest has a smaller longitudinal extension than its lateral extension. The third portion 17 comprises an elastic planar and flat piece or sheet of material such as for example a latex sheet or fabric weave reinforced with a rubber weave, the list is non-exhaustive. The third portion 17 extends to the first portion 6, which forms a rectangular piece flat piece with a continuous and opaque surface, i.e., in this embodiment the first portion 6 forms an opaque portion 6. The first portion comprises a more dense weave than either of the second 7 and third 17 portions or it may comprise a material such as vinyl that allows no more than 10% of the visible light to transmit through the first portion 6, or no more than 5% or no more than 3% or no more than 1%. The first portion 6 extends to the front portion 10 which comprises a planar structure 11 forming a flat rectangular piece. The shape of the planar structure may advantageously be adapted so that the front end 18 fits the layout of the front of the luggage compartment. For example, concave or convex shapes may also be possible. Adjacent to the first portion 6, on either lateral side, the front portion 10 comprises fastening members 13 that protrude laterally so that they are engageable with corresponding holding elements (not shown) arranged in the luggage compartment. Adjacent to the front portion 10 and laterally centered the first portion 6 is provided with a cutout 14 which may be reinforced around the edges to avoid expansion of the cutout. The fastening members 13 form lateral ends of a rigid elongated member (not shown) arranged laterally on the front portion adjacent to the cutout 14 so that a user may hold and/or push the elongated member through the cutout 14. Furthermore, the planar structure 10 may be formed to have a longitudinal extension greater than 200 mm without a handle in the planar structure 10.

Furthermore, the front portion 10 of the embodiment illustrated in FIG. 3A comprises engaging elements 15 in the form of for example magnets, Velcro or snap in buttons. The engaging elements 15 are arranged adjacent to each corner adjacent to the front end 18, which engaging elements may be adapted to releasably attach to corresponding engaging elements (not shown) on the tailgate (not shown) and/or at the front of the luggage compartment (not shown) so that unintended movements, vibrations or noises of the front portion 10 may be reduced.

The second portion 7 and the third portion are attached to each other along a common lateral edge 22. The attachment may be formed by sewing, gluing, riveting, welding, clamping, etc., the list is non-exhausting.

The third portion 17 and the first portion 6 are similarly attached to each other along a common lateral edge 23 and the first portion may be similarly attached to the front portion 10. Furthermore, the common lateral edge 22 between the third portion 17 and the second portion 7 may comprise lateral protrusions that may engage with the opening (not shown) of the tailgate (not shown) so that the second portion 7 may be prevented from protruding through the opening (not shown).

While FIG. 3A is a schematic illustration of this embodiment it may be noted that the total length of the load cover 4 from the fixed end 19 to the front end 18 is equal to a distance $D_{Total,L1}$ in this illustrated state of rest. $D_{Total,L1}$ may preferably be shorter than $D_{retracted}$ so that in the retracted position there is a pretension force due to the elastic properties of the load cover, since the pretension may reduce unwanted movement, vibrations or noise. Furthermore, the first portion 6 of this embodiment may in this illustrated state of rest have a longitudinal extension which is less than 10% shorter than its longitudinal extension in the open tailgate position. The second portion 7 may preferably be adapted to elastically expand to a longitudinal extension equal to or greater than the longitudinal extension of the first portion 6 in this illustrated state of rest.

Figure 3B:
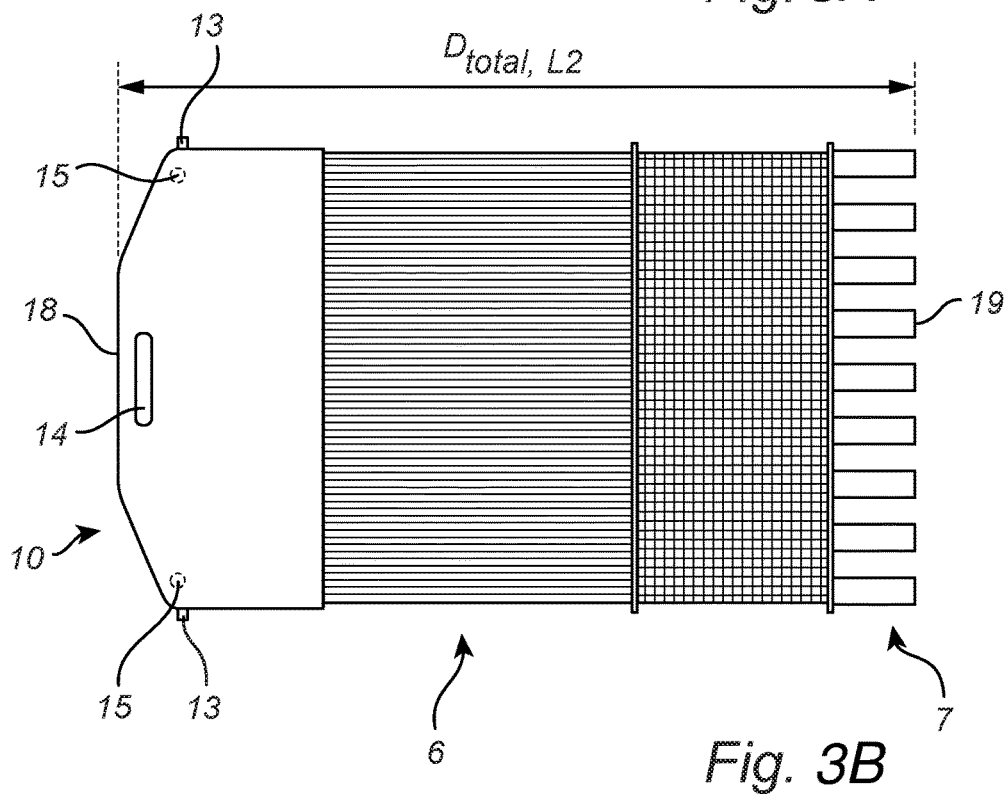

FIG. 3B shows a schematic top view of a load cover 4 according to a different exemplary embodiment from FIG. 3A. Describing the load cover 4 from the fixed end 19, the load cover 4 extends from a second portion 7 to a first portion 6 to a front portion 10 to the front end 18. The fixed end 19 forms an edge on the second portion 7 which comprises a plurality of equidistant parallel straps that are separated from each other. Compared to the embodiment illustrated in FIG. 3A, the front portion 10 comprises fastening members 13 arranged adjacent to the front end 18 rather than adjacent to the first portion 6.

While FIG. 3B is a schematic illustration of this embodiment it may be noted that the total length of the load cover 4 from the fixed end 19 to the front end 18 is equal to a distance $D_{Total,L2}$ in this illustrated state of rest. $D_{Total,L2}$ in is not necessarily equal to $D_{Total,L1}$, either for adaptation to a different model of vehicle (not shown) or due to different elastic properties of the load cover 4 illustrated in FIG. 3B compared to the load cover 4 illustrated in FIG. 3A. However, $D_{Total,L2}$ may similarly to $D_{Total,L1}$ be shorter than $D_{retracted}$ so that in the retracted position there is advantageously a pretension force due to the elastic properties of the load cover, since the pretension may reduce unwanted movement, vibrations or noise. Furthermore, the first portion 6 of this embodiment may comprise for example vinyl and may in this illustrated state of rest have a longitudinal extension which is less than 5% shorter than its longitudinal extension in the open tailgate position. The illustrated longitudinal length of the first 6 and second 7 portion of the load cover 4 may preferably be equal to or smaller than the length $D_{internal}$. The second portion 7 may preferably be adapted to elastically expand to a longitudinal extension equal to or greater than the longitudinal extension of the first portion 6 in this illustrated state of rest.

Figure 3C:
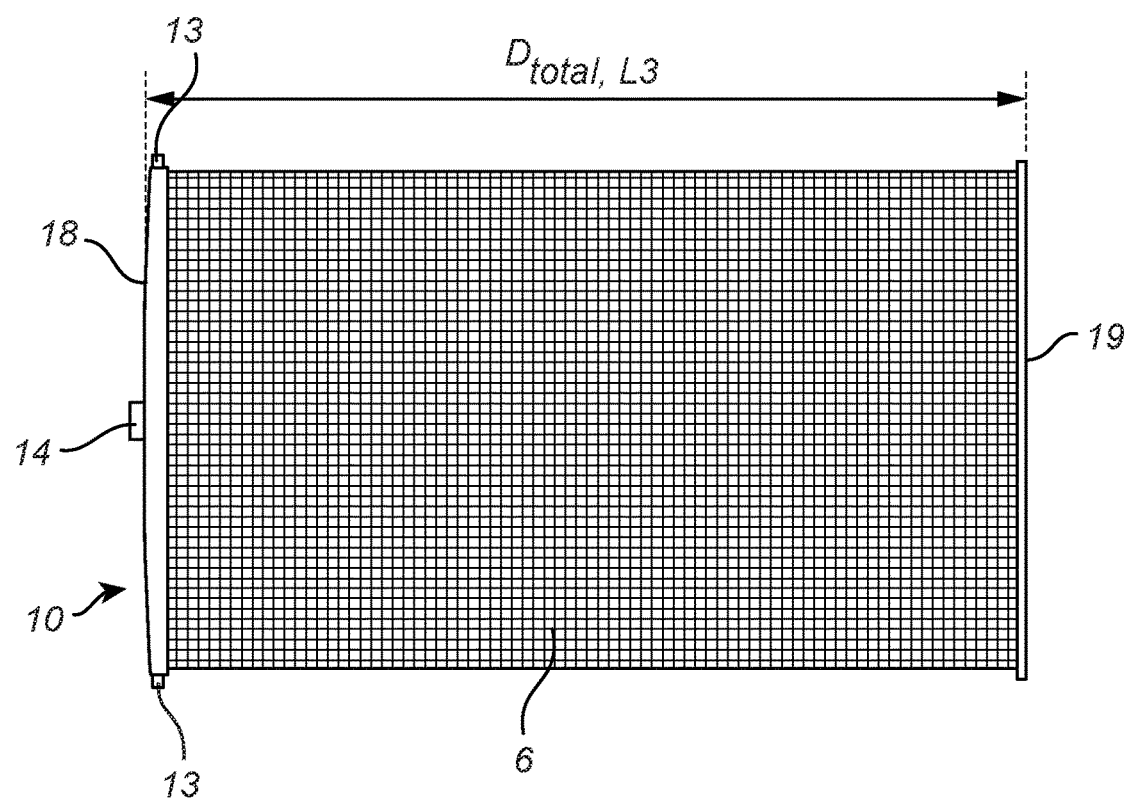

FIG. 3C shows a schematic top view of a load cover 4 according to a different exemplary embodiment from FIG. 3A and FIG. 3B. Describing the load cover 4 from the fixed end 19, the load cover 4 extends from a first portion 6 to a front portion 10 to the front end 18. Furthermore, compared to the embodiments illustrated in FIG. 3A and FIG. 3B, the front portion 10 comprises an elongated bar, the lateral ends of which form fastening members 13. A handle 14 in the form of a lip or protrusion is arranged centrally on the elongated bar of the front portion 10.

While FIG. 3C is a schematic illustration of this embodiment it may be noted that the total length of the load cover 4 from the fixed end 19 to the front end 18 is equal to a distance $D_{Total,L3}$ in this illustrated state of rest. $D_{Total,L3}$ in is not necessarily equal to $D_{Total,L1}$ or $D_{Total,L2}$, either for adaptation to a different model of vehicle (not shown) or due to different elastic properties of the load cover 4 illustrated in FIG. 3B compared to the load cover 4 illustrated in FIG. 3A or compared to the load cover 4 illustrated in FIG. 3B. $D_{Total,L3}$ may be smaller than or equal to $D_{internal}$ so that in the retracted position there is advantageously a pretension force due to the elastic properties of the load cover, since the pretension may reduce unwanted movement, vibrations or noise. Furthermore, the first portion 6 of this embodiment may be elastically expandable to a longitudinal extension equal to or greater than the sum of the distances $D_{internal}$ and $D_{open}$ in the open tailgate position.

FIG. 4A illustrates a cross section of a rear part of the vehicle 1, including the tailgate 2, the luggage compartment 16 and the load cover arrangement 3. The tailgate 2 is closed and the load cover arrangement 3 is in the closed tailgate position with the front portion 10 attached at the front of the luggage compartment 16. The front end 18 is arranged abutting the rear seats of the vehicle 1, the front end 18 is provided with a reference B illustrated with a line to clarify reference points for measuring extension of the load cover 4. The holding elements 12, here illustrated as hooks, support and hold the fastening members 13 of the front portion 10 adjacent to a common connecting edge between the front portion and the first portion 6 of the load cover 4. The first portion 6 is stretched to extend between the front portion 10 and the fixed end 19 arranged in the tailgate 2. The opening in the tailgate 9 has a front side facing the interior illustrated with a reference A marked with a line to clarify reference points for measuring extension of the load cover 4. Inside the tailgate 2 the load cover 4 is attached with the fixed end 19 at the lower portion of the tailgate 2 and a rounded elongated member 24 supports the load cover 4 adjacent to the opening 9. The load cover 4 may run freely over the rounded elongated member 24 as the first portion 6 of the load cover 4 stretches and retracts. A reference C is marked with a line drawn at the fixed end 19 to clarify reference points for measuring extension of the load cover 4 inside the tailgate 2.

Two alternative embodiments of the load cover arrangement 3 inside the tailgate are illustrated in the cross sectional details FIG. 4A' and FIG. 4A" below FIG. 4A. A first alternative embodiment comprises the elongated member 5, in the form of an elongated round bar 5, arranged at a vertical center of the enclosure 8 of the tailgate 2. A rounded routing member 25 is arranged lower than the elongated bar 5 and a further rounded member 24 is arranged higher than the elongated bar 5. The load cover 4 may be arranged to extend from reference C at the fixed end 19 attached to the elongated bar 5, downwards to a reference D at the rounded routing member 25 around which it is routed to run freely upwards toward the rounded member 24 around which it is freely routed towards reference line A at the front of the opening 9. Thus, the load cover arrangement 3 may be arranged so that the load cover 4 extends from C to A, via D such that the distance $D_{internal}$ may be longer than a height of the enclosure 8 of the tailgate 2. The elongated bar 5 may be arranged to extend laterally adjacent to the interior side of the tailgate 2. The rounded member 24 and the rounded routing member 25 may be arranged to extend laterally adjacent to the exterior side of the tailgate 2. The longitudinal separation of the elongated bar and the rounded elongated members 24, 25 may allow the load cover to extend with a reduced risk of entanglement.

A second alternative embodiment comprises the fixed end 19 of the load cover 4 attached to a lower side of the tailgate 2 by means of fastening means such as buttons, nails, glue, welding, press fit fixation, etc. A rounded elongated edge 24' in the enclosure 8 may be arranged adjacent to the opening 9. The load cover 4 may be arranged to extend from reference C at the fixed end 19 toward the rounded edge 24' around which it is freely routed towards reference line A at the front of the opening 9.

FIG. 4B illustrates the cross section of a rear part of the vehicle 1 shown in FIG. 4A. However, the tailgate 2 is open and the load cover arrangement 3 is in the open tailgate position with the front portion 10 attached at the front of the luggage compartment 16. The front end 18 is arranged in the same way as in FIG. 4A, but additionally the fastening members 13 are illustrated with a reference E marked with a line to clarify reference points for measuring extension of the load cover 4. The planar structure 11 of the front portion 10 extends horizontally between E and B. The first portion 6 is stretched to extend inclined between the front portion 10 at E and the reference A at the front of the opening 9 in the opened tailgate. The tailgate 2 and enclosed components may be similar to FIG. 4A. It may be noted that the fastening members 13 may be arranged at the front end 18 in which case B and E may coincide or the extension of the load cover 4 between B and E may be inclined relative to the horizontal plane on which the vehicle is placed.

FIG. 4C illustrates the cross section of a rear part of the vehicle 1 shown in FIG. 4A. However, the load cover arrangement 3 is in the retracted position with the first portion 6 retracted into the tailgate 2 and the front portion 10 folded down flat against the interior facing side of the tailgate 2. The front end 18 is arranged downwards facing the floor of the luggage compartment 16 and a reference F illustrated with a line to clarify reference points for measuring extension of the load cover 4. A minor protruding extension of the first portion 6 and the planar structure 11 of the front portion 10 extend vertically between A and F.

Specific embodiments of the disclosure have now been described. However, several alternatives are possible as well as combinations, as would be apparent for someone skilled in the art. For example, the position and form of the handle in FIG. 4A may be the used on any of the other embodiments such as the ones illustrated in FIGS. 2, 3B and 3C. Further examples include that the load cover may comprise one, two, three or more portions that are fabric like. At least one of the portions of the load cover may be elastic. The second portion may be more elastic than the third portion or the third portion may be more elastic than the second portion. Someone skilled in the art will realize that depending on the model of the vehicle the dimensions and the relative proportions of the luggage compartment and the tailgate may vary and consequently the dimensions and proportions of the portions of the load cover arrangement may vary, as well as the appropriate materials for the load cover arrangement.

Furthermore, the third portion may comprise straps that may be connected to a single point inside the tailgate.

Such and other obvious modifications must be considered to be within the scope of the present disclosure, as it is defined by the appended claims. It should be noted that the above-mentioned embodiments illustrate rather than limit the disclosure, and that those skilled in the art will be able to design many alternative embodiments without departing from the scope of the appended claims.

What is claimed is:

1. A load cover arrangement for an interior luggage compartment of a vehicle, the load cover arrangement comprising:
    a tailgate of the vehicle,
    a load cover having a fixed end attached to the tailgate, and
    a front portion having fastening members for releasably attaching a front end of the load cover to a front side of the luggage compartment, and when attached, the load cover extends a distance $D_{closed}$ in a closed tailgate position, and a distance $D_{open}$ in an open tailgate position, as measured from an opening in the tailgate and along the load cover in a longitudinal direction of the luggage compartment to the front end of the load cover,
    wherein the fixed end of the load cover is arranged inside of the tailgate where the load cover extends an internal distance $D_{internal}$, and the load cover projects out through the opening in the tailgate,
    wherein at least a portion of the load cover is resiliently elastic so that it is stretchable between a retracted position with a first length of $D_{retracted}$, the closed tailgate position with a second length $D_{closed}$ and the open tailgate position with a third length $D_{open}$.

2. The load cover arrangement according to claim 1 wherein the load cover has an extension ratio of $(D_{internal}+D_{open})/(D_{internal}+D_{retracted})$.

3. The load cover arrangement according to claim 1 wherein the load cover comprises an opaque portion, being abutted to the front portion, wherein the opaque portion in combination with the front portion have an extension of at least a length $D_{closed}$ from the front end towards the fixed end, when in the closed tailgate position.

4. The load cover arrangement according to claim 3 wherein at least the opaque portion of the load cover has a lateral extension covering at least 90% of a lateral extension of the luggage compartment.

5. The load cover arrangement according to claim 1 wherein the load cover comprises a first cover portion arranged adjacent to the front portion, and a second cover portion arranged adjacent to the fixed end, wherein the second cover portion has an extension ratio $\lambda_{2nd}$ that is greater than an extension ratio of the first cover portion.

6. The load cover arrangement according to claim 5 wherein the first cover portion is an opaque portion.

7. The load cover arrangement according to claim 5 wherein the load cover further comprises a third cover portion arranged between the first and the second cover portions, wherein the third cover portion has an extension ratio $\lambda_{3rd}$ that is greater than $\lambda_{2nd}$.

8. The load cover arrangement according to claim 5 wherein the second cover portion has a final length that is less than $D_{internal}$.

9. The load cover arrangement according to claim 7 wherein the third cover portion has a final length that is less than or equal to the difference between $D_{open}$ and $D_{closed}$.

10. The load cover arrangement according to claim 5 wherein the second cover portion comprises one or more elastic straps.

11. The load cover arrangement according to claim 1 wherein $D_{internal}$ is larger than $D_{closed}$.

12. The load cover arrangement according to claim 1 further comprising an elongated routing member arranged further from the opening in the tailgate than the fixed end of the load cover, so that the load cover extends the distance $D_{internal}$ from the fixed end via the elongated routing member to the opening and subsequently extends to project out through the opening in the tailgate.

13. The load cover arrangement according to claim 1 wherein $D_{open}$ is 15%+/−10% greater than $D_{closed}$.

14. The load cover arrangement according to claim 1 wherein the front portion comprises a planar structure that is larger than the opening in the tailgate.

15. The load cover arrangement according to claim 14 wherein the planar structure has a length that covers at least 20% of a longitudinal extension of the luggage compartment.

16. A load cover for use with a vehicle having an interior luggage compartment and a tailgate, the load cover comprising:
   a front portion having a front end;
   a rear end configured to be fixedly attached to the tailgate such that the rear end is arranged inside the tailgate; and
   a fastening member for releasably attaching the front portion to the luggage compartment such that, when attached, the load cover extends a distance $D_{closed}$ in a closed tailgate position, and a distance $D_{open}$ in an open tailgate position, as measured from an opening in the tailgate and along the load cover in a longitudinal direction of the luggage compartment to the front end;
   wherein at least a portion of the load cover is resiliently elastic so that the load cover is stretchable when the load cover moves between the closed tailgate position and the open tailgate position.

17. A vehicle comprising:
   an interior luggage compartment;
   a tailgate having an opening; and
   a load cover including:
      a front portion having a front end;
      a rear end fixedly attached to the tailgate such that the rear end is arranged inside the tailgate; and
      a fastening member for releasably attaching the front portion to the luggage compartment such that, when attached, the load cover extends a distance $D_{closed}$ in a closed tailgate position, and a distance $D_{open}$ in an open tailgate position, as measured from the opening in the tailgate and along the load cover in a longitudinal direction of the luggage compartment to the front end;
      wherein at least a portion of the load cover is resiliently elastic so that the load cover is stretchable when the load cover moves between the closed tailgate position and the open tailgate position.

18. The load cover arrangement of claim 14 wherein the planar structure firms a flat rectangular piece that is configured to have a horizontal orientation when the front portion is attached to the luggage compartment, and to assume an upright position against the tailgate when the load cover is in the retracted position.

19. The load cover according to claim 16 further comprising a first cover portion arranged adjacent to the front portion, and a second cover portion arranged adjacent to the rear end, wherein the second cover portion has an extension ratio $\lambda_{2nd}$ that is greater than an extension ratio of the first cover portion.

20. The vehicle according to claim 17 wherein the load cover comprises a first cover portion arranged adjacent to the front portion, and a second cover portion arranged adjacent to the rear end, wherein the second cover portion has an extension ratio $\lambda_{2nd}$ that is greater than an extension ratio of the first cover portion.

* * * * *

UNITED STATES PATENT AND TRADEMARK OFFICE
CERTIFICATE OF CORRECTION

PATENT NO. : 9,931,989 B2
APPLICATION NO. : 15/257345
DATED : April 3, 2018
INVENTOR(S) : Jonathan Disley et al.

It is certified that error appears in the above-identified patent and that said Letters Patent is hereby corrected as shown below:

In the Claims

Column 16, Line 17, Claim 18:
After "planar structure"
Delete "firms" and
Insert -- forms --.

Signed and Sealed this
Thirty-first Day of July, 2018

Andrei Iancu
*Director of the United States Patent and Trademark Office*